3,845,202
LUNG SCANNING PROTEIN MACROAGGREGATE OF INDIUM 113m IN A SULFIDE-SULFUR COMPOSITION
Manuel Tubis and Marvin B. Cohen, Los Angeles, and Calvin D. Gilliam, Sylmar, Calif., assignors to the United States of America as represented by the Administrator of Veterans Affairs
No Drawing. Filed Oct. 24, 1972, Ser. No. 300,315
Int. Cl. A61k 27/04; G01e 1/20
U.S. Cl. 424—1                7 Claims

ABSTRACT OF THE DISCLOSURE

A lung scanning agent containing an Indium 113m sulfide-sulfur composition is disclosed. The particles of these compositions are coated with gelatin which is hardened by a crosslinking agent such as glutaraldehyde. The use of Indium 113m allows the preparation of a desirable lung scanning agent from readily available generators having a long shelf life. Other radionuclides of Indium having desirable radionuclidic properties can also be employed.

BACKGROUND AND SUMMARY OF THE INVENTION

The present invention relates to an improved lung scanning agent in which there is employed a radioisotope. More particularly, the present invention relates to lung scanning agents containing Indium 113m sulfide-sulfur compositions in which the particles are coated with gelatin hardened by a crosslinking agent such as glutaraldehyde.

Previous agents which have been employed for lung scanning have included Iodinated I 131 Serum Albumin Aggregated, abbreviated as I 131-MAA and Technetium 99m Serum Albumin Aggregated, abbreviated as Tc 99m-MAA. Use of the prior agent I 131-MAA requires blocking the thyroid gland to decrease the thyroid and whole-body radiation and can only be used safely in small doses in the range of up to 300 microcuries. The use of the prior agent Tc 99m-MAA has been hampered by the lack of the radionuclide or its generators in some areas of the world.

By the present invention there is provided an improved lung scanning agent which contains Indium 113m sulfide-sulfur compositions in which the particles are coated with gelatin hardened by a crosslinking agent such as glutaraldehyde. The glutaraldehyde is employed to cross-link the amino groups in the gelatin to provide particles of the optimal size and to produce short term stable, biodegradable macroaggregates. The lung scanning agents of the present invention may be prepared from the eluate of a Tin 113-Indium 113m generator. The Indium 113m is precipitated in the sulfide form along with sulfur, in the presence of gelatin, following which the gelatin is hardened with glutaraldehyde. The use of Indium 113m allows the preparation of a desirable lung scanning agent from readily available generators having a long shelf life. The lung scanning agents of the present invention may be safely employed in doses of up to about 3 millicuries, or about 10 times the dosage of some prior lung scanning agents, so that scans are produced having much better resolution while at the same time resulting in lower whole-body radiation doses. Thus there is provided by the present invention a novel lung scanning agent in the form of Indium 113m sulfide macroaggregate, hereinafter referred to as "In SMA."

DESCRIPTION OF THE PREFERRED EMBODIMENTS

Indium 113m sulfide macroaggregate has been found to be an excellent lung perfusion scanning agent which may be readily and easily prepared from the eluate of a Tin 113-Indium 113m generator. Construction and operation of such generators is described, for example, in U.S. Pat. No. 3,561,932.

Glutaraldehyde is the preferred gelatin crosslinking agent, but other crosslinking agents such as formaldehyde may be employed instead of glutaraldehyde, such gelatin crosslinking agents being fully described in U.S. Pat. No. 2,800,457.

In preparing the macroaggregate of the present invention, sulfur is precipitated and along with it the Indium sulfide is co-precipitated. The source of the sulfur is a thiosulfate, preferably sodium thiosulfate, which reacts with hydrochloric acid to produce free sulfur, some of which combines with the Indium 113m ions.

While gelatin is the preferred substance employed in producing the particulate form of the present compositions, other physiologically acceptable proteinaceous substances such as albumin may also be employed. The particles are prepared such that their size can be controlled by the presence of the gelatin. The size is dictated by the specific intended use, in this instance, the blockage of some of the capillaries of the lungs.

When these particles of the proper size are injected into the blood stream, they are carried to the lungs where they block some capillaries and, while in this position, they are capable of revealing the function and structure of the lungs. The resulting scintigraph of the trapped particles in the lungs aids in the diagnosis of the condition of the lungs.

The scanning agent of the present invention has the advantage that it can be readily available whereas agents containing Technetium 99m, for example, are frequently not available in regular supply.

The "In SMA" is biodegradable by the lungs and liver and it appears that only a very small percent of the total radioactivity may be cleared more slowly without harm. The mean particle size of the present scanning agent is preferably in the range of about 20 to 25 microns, which is considered to be the most desirable size for a lung scanning agent.

The Indium 113m sulfide macroaggregate of the present invention was prepared according to the following method using previously prepared pyrogen-free, sterile reagents which have been sterilized by filtration through a 0.22 micron membrane filter:

EXAMPLE ONE

To a 30 ml. vented, sterile, pyrogen-free vial the following reagents were added in the order as listed:

1. 3 ml. Indium 113m eluate containing about 5 mCi In 113m
2. NaCl injection, 0.5 ml.
3. 4.3 mg. gelatin (U.S.P. or Research Grade) and 4.3 mg. $Na_2S_2O_3$, anhydrous or its equivalent, both contained in 0.5 ml. $H_2O$
4. 2.0 ml. of 2.0 N HCl solution.

The vial was heated for ten minutes in a boiling water bath, then cooled under running water, after which the following components were added in the order as listed:

5. Approximately 2.0 ml. of 2.0 N NaOH solution (The amounts of HCl and NaOH should be adjusted so that the solution prior to the addition of the phosphate will be acidic, preferably having a pH of about 2 to 3.)
6. 1 ml. of phosphate solution containing 200 mg. $NaH_2PO_4$, anhydrous or its equivalent
7. 0.6 ml. 25 weight percent solution of freshly filtered glutaraldehyde (The glutaraldehyde should be the purest grade obtainable, filtered to remove any solids before dilution and the final solution should be filtered through a 0.22 micron porosity membrane filter. The solution should be examined frequently and refiltered or discarded if any cloudiness occurs.) The vial was then heated for three minutes in a boiling water bath with continuous shaking, following which it was cooled under running water. Next the vial was centrifuged for one minute, the supernatant was removed, the sediment was washed with 5.0 ml. normal saline solution, recentrifuged and the supernatant was again removed and discarded. During the centrifuging and washing procedure, excess glutaraldehyde is removed. The sediment was then resuspended in 3 ml. normal saline solution and the total yield and activity per ml. were determined. The purity and identity of the product were established by paper chromatography.

The distribution of the agent "In SMA" of the present invention in the lungs and other organs of mice was determined after intravenous injection in a tail vein. One hour after injection, 91.5 to 96.2% of the activity was found in the lungs. The particles were shown to be biodegradable by the lungs from which site the smaller fragments formed were trapped by the liver. The short half-life, 1.66 hours, of Indium 113m resulted in reduced radiation even though the half-time of clearance from the lungs in mice was found to be from 2.1 to 6.8 days. Studies of the use of the present agent in rabbits have generally confirmed the observations in mice.

Any of the radionuclides of Indium having favorable properties for use in medical scintigraphy or scanning may be employed in the macroaggregates of the present invention. The use of Indium 113m is preferred because of the short half-life of this radionuclide, as well as the presence of gamma energy and the absence of beta emission associated with Indium 113m, the latter emission being undesirable in these compositions. Indium 111 is well suited for longer term studies and this radionuclide could also be employed together with Indium 113m in a combination of short and long term scanning studies in humans.

Clinical trials of the Indium 113m sulfide macroaggregate for human lung perfusion scans in patients with pulmonary pathology were carried out using a dose of 2 millicuries. These scans were examined by nuclear physicians have expertise in lung scanning and it was agreed that the scans were excellent in their revelation of the morphology and pathology of the lungs. All preparations were sterile and nonpyrogenic and no adverse reactions were observed. Comparative studies with Iodinated I 131 Serum Albumin Aggregated (I 131-MAA) and Technetium 99m Serum Albumin Aggregated (Tc 99m-MAA) were performed and the results indicated that the agent of the present invention was superior to I 131-MAA and Tc 99m-MAA.

Clinical trials were carried out using 2 millicuries of the agents of the present invention for human lung scanning. The calculated dose of radiation received by the patient was reduced very desirably by 90% from that received with the customary dose of I 131-MAA and was only slightly higher than that of the Tc 99m-MAA. Studies performed to date indicate that the Indium 113m sulfide macroaggregate of the present invention is comparable to the Tc 99m-MAA and far superior to the I 131-MAA as a perfusion lung scanning agent. No adverse patient reactions have been associated with the use of the agents of the present invention.

A study of possible long term effects of Indium in rats, using longer half life radionuclides of the element, showed no significant physiological, biochemical or histopathological changes within six months after the injection of up to 10,000 times the doses of Indium used in routine scanning procedures (see Usher, M. S. et al., Long Term Effects of Indium Administration in Rats, J. Nucl. Med, 11:155, 1970).

The experimental work performed thus far has shown the Indium 113m sulfide macroaggregate of the present invention to be safe and effective for the nuclear medical use proposed. A somewhat similar Tc 99m compound containing rhenium sulfide which leaves a small amount of residue has been in routine clinical use since 1966 without showing any adverse effects due to the retained trace amounts of sulfur in the liver.

It is believed that the invention and many of its attendant advantages will be understood from the foregoing description, and it will be apparent that minor changes may be made in the composition and method as disclosed without departing from the spirit and scope of the invention or sacrificing all of its material advantages, the forms hereinbefore described being merely preferred embodiments thereof.

It is claimed:

1. A macroaggregate composition suitable for use as a lung scanning agent, comprising the product obtained by reacting the eluate from a Tin 113–Indium 113m generator with a physiologically acceptable proteinaceous substance selected from the group consisting of gelatin and albumin and a sulfur compound which is capable of precipitating Indium 113m in the sulfide form along with sulfur during the course of the reaction, the product being further reacted with an aldehyde crosslinking agent for the physiologically acceptable proteinaceous substance to produce a composition in particulate form.

2. The composition of claim 1 having a particle size in the range of about 20 to 25 microns.

3. The composition of claim 1 wherein the crosslinking agent is selected from the group consisting of glutaraldehyde and formaldehyde.

4. The composition of claim 1 wherein the sulfur compound is sodium thiosulfate.

5. In the radioisotope scanning of mammals, the improvement which comprises empolying as the scanning agent the composition of claim 1.

6. In the radioisotope scanning of mammals, the improvement which comprises employing as the scanning agent the composition of claim 3.

7. In the radioisotope scanning of mammals, the improvement which comprises employing as the scanning agent the composition of claim 4.

References Cited

UNITED STATES PATENTS 3,663,685   4/1972   Evans _____ 424—1

OTHER REFERENCES

Feine, Nuclear Science Abstracts, Vol. 23, No. 22, Nov. 30, 1969, item 45817.

Ciscoto et al., Nuc. Sci. Abs., Vol. 24, No. 16, Aug. 31, 1970, p. 3163, item 32051.

Morris, Nuc. Sci. Abs., Vol. 23, No. 22, Nov. 30, 1969, p. 4685, item 45810.

Filbee et al., Int. J. Appl. Radiat. Isotop., 1969, Vol. 20, pp. 552–553.

BENJAMIN R. PADGETT, Primary Examiner

U.S. Cl. X.R.

23—230 B; 250—303; 252—301.1 R